(12) United States Patent
Kitaoka et al.

(10) Patent No.: US 6,710,932 B2
(45) Date of Patent: Mar. 23, 2004

(54) ZOOM LENS SYSTEM WITH TEMPERATURE COMPENSATION FUNCTION AND VIDEO CAMERA USING THE SAME

(75) Inventors: Yasuhisa Kitaoka, Tokushima (JP); Yukihiro Takabatake, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/316,377

(22) Filed: Dec. 11, 2002

(65) Prior Publication Data

US 2003/0137746 A1 Jul. 24, 2003

(30) Foreign Application Priority Data

Dec. 17, 2001 (JP) .......................... 2001-382410

(51) Int. Cl.$^7$ ............................... G02B 15/14
(52) U.S. Cl. ................. 359/686; 359/687; 359/649
(58) Field of Search ................. 359/676, 684, 359/686, 687, 694

(56) References Cited

U.S. PATENT DOCUMENTS 5,032,013 A * 7/1991 Shibayama ................. 359/687
5,880,892 A * 3/1999 Ohtake ...................... 359/686
2001/0015856 A1 * 8/2001 Yoneyama .................. 359/687

FOREIGN PATENT DOCUMENTS

| JP | 05-093832 | 4/1993 |
| JP | 08-297244 | 11/1996 |
| JP | 09-311272 | 12/1997 |
| JP | 10 293261 | 11/1998 |

* cited by examiner

*Primary Examiner*—Georgia Epps
*Assistant Examiner*—M. Hasan
(74) *Attorney, Agent, or Firm*—RatnerPrestia

(57) ABSTRACT

A zoom lens system with temperature compensation function includes the first lens group having a positive refractive power, the second lens group that has negative refractive power and moves along an optical axis, the third lens group having a plastic lens of positive refractive power, the fourth lens group that has positive refractive power and moves along the optical axis, the first lens barrel which extends from the first lens group to the third lens group, and the second lens barrel which extends from the third lens group to an image pickup element, and expansion or contraction of at least one of lens barrels in accordance with temperature change cancels variation of image location caused by temperature change of the lens groups.

18 Claims, 9 Drawing Sheets

ZOOM LENS SYSTEM WITH TEMPERATURE COMPENSATION FUNCTION AND VIDEO CAMERA USING THE SAME

FIELD OF THE INVENTION

The present invention generally relates to a zoom lens system having temperature compensation function and a video camera using the same. In particular, the present invention relates to a compact, high zoom ratio and low-cost zoom lens system with temperature compensation function using a plastic lens, and a video camera using the zoom lens system.

BACKGROUND OF THE INVENTION

Conventionally, in an optical system for a video camera, such as a camcorder or a digital still camera, a zoom lens system that has four lens groups is well known. The system includes, in order from an object side, the first lens group that has positive refractive power, the second lens group that has negative refractive power, the third lens group that has positive refractive power, and the fourth lens group that has positive refractive power. The first lens group and the third lens groups are both fixed. The second lens group moves along an optical axis for zooming, and the fourth lens group moves along the optical axis for focusing and for compensating image surface blur caused by zooming.

Japanese patent laid-open publication No. H09-311272 discloses an optical system that reduces the cost by using five plastic lenses in a lens system of total ten lenses. In this system, variation of focal position of the entire optical system caused by temperature change is reduced by canceling focal length change caused by temperature change. This is accomplished by combining a plastic convex lens and a plastic concave lens. However, if the plastic lens is to be used in a compact optical system, problems occur such as it is difficult to keep the Petzval sum small and the coma aberration becomes big. This is because the refractive index of plastic lens is lower than that of glass lens.

Another Japanese patent laid-open publication No. H05-93832 discloses a zoom lens system that has a detection means for detecting temperature of the lens system and outputting an electrical signal based on the detected temperature, and a control means for driving a lens by the electrical signal in order to compensate divergence of the focus caused by temperature change of a plastic lens by moving the lens. This system includes a detection means and a control means; therefore, it is inevitable that it will be expensive.

In addition, Japanese patent laid-open publication No. H10-293261 discloses that deviation of an image forming position due to the temperature characteristic of a plastic lens is compensated by expansion or contraction of a lens barrel in accordance with temperature change.

Moreover, it is desirable to utilize an aspherical lens in order to achieve a compact and high-performance zoom lens system.

As a means for molding an aspherical surface, a molding method for glass lens, plastic injection molding, and what is called a hybrid-lens that is formed by putting a plastic layer on a spherical glass lens, are well known. An aspherical glass lens may require a molding method performed at high temperature, and therefore life duration of the expensive die molding is short. For that reason, cost of an aspherical glass lens is about three times as expensive as that of spherical glass lens. Regarding hybrid type lens, there is no restriction in the kind of glass available, but the hybrid lens requires glass lens and a mold for plastic layer. Therefore, a hybrid lens is also expensive in cost though it is not so expensive as glass molding. A plastic lens is inexpensive compared to glass and hybrid. However, the refractive index of a plastic lens is low, and types of available plastic lenses are limited. Besides, if a plastic lens is to be used in a compact optical system by a strengthening power arrangement, coma becomes big, Petzval sum is difficult to keep small, and is easily influenced by temperature change.

SUMMARY OF THE INVENTION

A zoom lens system includes a first lens group, a second lens group that moves along an optical axis, a third lens group that has a positive refractive power, negative temperature coefficient of refractive index, and a predetermined focal length, a fourth lens group that moves along the optical axis, a first lens barrel which extends from the first lens group to the third lens group, and a second lens barrel which extends from the third lens group to an image pickup element, wherein the first and second lens barrels each has a respective predetermined linear expansion coefficient, and variation of image location caused by temperature change in the first, second, third and fourth lens groups is cancelled by image location variation caused by expansion or contraction of at least one of the first lens barrel and the second lens barrel.

In addition, the third lens group includes a plastic lens and the plastic lens satisfies the following conditional expression:

$$5.0 < f3/fw < 7.0$$

where f3 is a focal length of the plastic lens of the third lens group, and fw is a focal length of the zoom lens system at the wide-angle end.

DETAILED DESCRIPTION OF THE INVENTION

Hereinafter, preferred embodiments of the present invention will be described referring to FIGS. 1 through 9.

(The First Embodiment)

Figure 1:
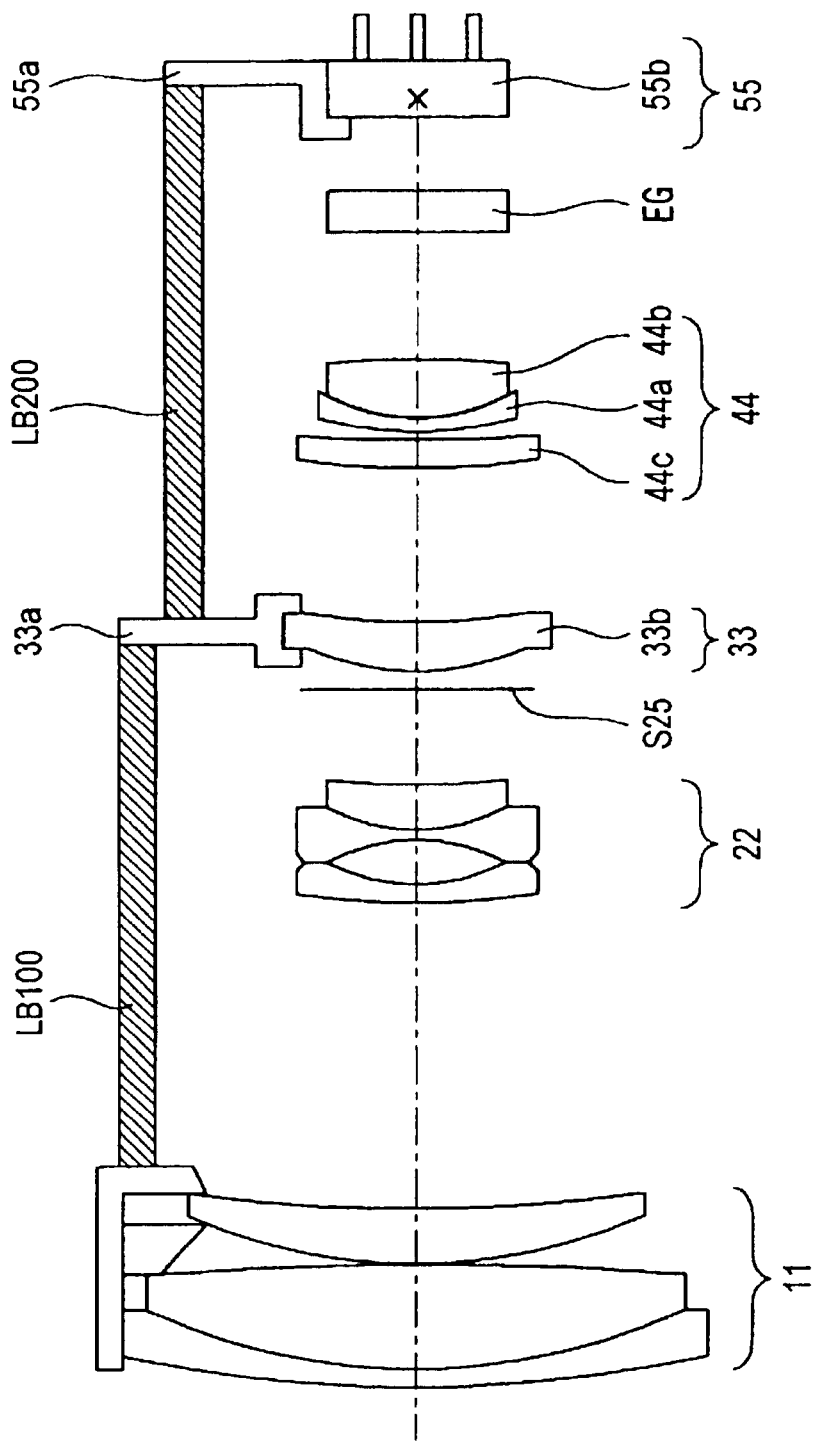
FIG. 1 is a sectional view showing construction of a zoom lens system according to a first exemplary embodiment of the present invention.

FIG. 1 shows a sectional view of a zoom lens construction according to the first embodiment of the present invention, and in detail, outline of the main section of a lens barrel that has a lens system is shown. In FIG. 1, the first lens group 11, the second lens group 22, the third lens group 33, and the fourth lens group 44 are lens groups. Lens holding member 33a of lens barrel LB100 holds the third lens group. The first lens group 11 of positive refractive power is fixed. The second lens group 22 has negative refractive power. The third lens group 33 has a plastic lens 33b that has refractive index of negative temperature coefficient. At least one surface of the plastic lens 33b is an aspherical surface. The fourth lens group 44 has three elements in two groups, a positive cemented lens composed of negative lens 44a and positive lens 44b, and a plastic lens 44c. At least one surface of the plastic lens 44c is an aspherical surface. In image pickup element 55, lens holding member 55a of a lens barrel LB200 holds image location 55b on which image surface is positioned. CCD is used as the image pickup element 55. Diaphragm S25 exists between the second lens group 22 and the third lens group 33. Glass EG is equivalent glass which functions as cover glass for image pickup element and lowpass filter and so on. The second lens group 22 and the fourth lens group 44 move along an optical axis.

In this embodiment, as shown in FIG. 1, a compact zoom lens system with a high zoom ratio is possible with a total of ten lenses, which includes three lenses in the first lens group, three in the second lens group, one in the third lens group and three in the fourth lens group. In addition, it is possible to omit the aspherical plastic lens 44c and to make the lens system a nine-lens system. In this case, the lens 44b desirably has an aspherical surface.

In general, lens construction used for a zoom lens system has four-group construction, with the second lens group that has negative refractive power, the third lens group that has positive refractive power, and the fourth lens group that has positive refractive power. When zoom is activated, the fourth lens group moves on a predetermined path for focus adjustment, corresponding to move of the second lens group.

The zoom lens system of the present embodiment is made taking particular note on variation (blurring amount) of image location of the third lens group and temperature characteristics of the third lens group when zooming. Namely, even if only the lens of the third lens group consists of a plastic lens, variation of image location in zooming is small when the lens 33b satisfies a predetermined conditional expression (1):

$$5.0 < f3/fw < 7.0 \quad (1)$$

where f3 is focal length of a plastic lens in the third lens group and fw is a focal length of the zoom lens at wide-angle end.

A plastic lens is worse in lens characteristics (including temperature characteristics) compared with a glass lens. However, in regard to the third lens, variation of image location is small as long as the conditional expression (1) is satisfied. If a powerful lens of one of the other lens groups is changed from glass to plastic, it is difficult to keep variation of image location in zooming within the allowable range.

Moreover, variation of image location in zooming caused by the third lens group is small over a temperature from low temperature to high temperature.

Therefore, if the third lens group consists of a plastic lens, it is possible to correct the variation when zooming, and the corrected variation of image location can be within range of focal depth. That is, if the third lens group consists of a plastic lens, change of refractive index according to temperature change is bigger and absolute variation amount of image location is bigger, when compared with a glass lens. However, variation can be cancelled by expansion or contraction of the lens barrel caused by temperature change because dispersion range of variation (in other words, non-linearity portion of the variation) is small. In the present embodiment, one positive refractive plastic lens is used, but a plurality of lenses may be used.

Furthermore, in the present embodiment, a plastic lens is used for providing an aspherical surface required for the fourth lens group 44. That is, in order to reduce cost, a weak power plastic lens with an aspherical surface is used. Because a weak power plastic is used, it is not necessary to take variation of image location caused by zooming or temperature change into consideration.

Plastic materials such as cyclic olefin polymer, polymethyl methacrylate, polycarbonate resin, styrene resin can be used as a plastic lens material for this embodiment.

Lens barrel LB100 extends from the first lens group 11 to the third lens group 33 and holds them, and lens barrel LB200 extends from the third lens group 33 to the image pickup element 55 and holds them. Expansion or contraction of these lens barrels is affected by temperature change.

Here, effect of the first embodiment of the present invention is explained using concrete value. In general, PPS (polyphenylene sulfide) or PC (polycarbonate) and so on is used as a material for the lens barrel. When PC is used, glass fiber is added to improve stiffness or dimensional stabilization. As a result, it becomes possible to vary linear expansion coefficient, for example, between $2 \times 10^{-5}$ and $7 \times 10^{-5}$. In this embodiment, each span of the lens barrel LB100 and LB200 is set to 30 mm respectively and the lens barrel LB100 uses material with a linear expansion coefficient of $3.4 \times 10^{-5}$, and the lens barrel LB200 uses material of $6.5 \times 10^{-5}$.

The lens barrel LB100 may be made of a material of the same linear expansion coefficient as the lens barrel LB200. The linear expansion coefficient of the lens barrels is positive, which extends the length when temperature rises. Temperature coefficient of the entire lens system is constructed to have a negative temperature coefficient that refractive index becomes small and back focus becomes longer when temperature rises.

In addition, because the lens barrel LB200 crosses from the third lens group to image pickup element 55, the effect of canceling out variation of the image location caused by temperature change is mainly controlled by the lens barrel LB200 rather than the lens barrel LB100. Therefore, when lens barrel LB200 is made of a material of large linear expansion coefficient, a more compact lens construction can be achieved. Additionally, the expansion or contraction amount of lens barrel LB200 directly relates to compensation of image location variation because the lens barrel LB200 holds the third lens group and the image pickup element 55. Compensation by expansion or contraction of LB100 is smaller than that of LB200.

In this construction, when temperature is changed from 20° C. to −20° C., the lens barrel LB100 shortens by 40.8 μm, and LB200 shortens by 78.0 μm. Variation of image location caused by the shortened LB100, which varies to some extent depending on zoom position, is +10.2 μm at the wide-angle end. On the contrary, when temperature is changed from +20° C. to −20° C., variation of image location caused by change of refractive index of the lens is −84.5 μm at wide-angle end. That is, final variation of image location in the first embodiment becomes as follows.

$$78.0+10.2-84.5=3.7(\mu m)$$

This level of value is within focal depth of the present lens system, and there is no problem in practical use. As for compensation of image location variation by expansion or contraction of the lens barrel, a similar effect is provided at the high temperature of 40° C.

As described above, in the first embodiment of the present invention, air space is changed appropriately utilizing expansion or contraction of lens barrels LB100 and LB200 by setting the linear expansion coefficient and length of lens barrels optimum. In addition, variation of image location in accordance with temperature change was kept small by setting power arrangement of the plastic lens between the third lens group and the fourth lens group optimum. As a result, good optical performance is maintained.

As described above, in order to correct variation of image location caused by temperature change, in the present embodiment, the third lens group is constructed to have a plastic lens that has positive refractive power and negative temperature coefficient of refractive index and at least one of the plastic lens surfaces is an aspherical surface.

The refractive index of the lens varies in accordance with temperature change and image location blurs. In the present embodiment, lens barrels that expand or contract in accordance with temperature change, are placed between the first lens group 11 and the third lens group 33, and between the third lens group 33 and image pickup element 55 on which image location is positioned. That is, in this construction, influence of temperature change is cancelled by setting the lens barrel's coefficient of linear expansion to be optimum, and by setting length of the lens barrel to correspond to image surface variation.

Spherical aberration and coma aberration are corrected by an aspherical surface.

The fourth lens group has three elements in two-group construction: a positive cemented lens (including a negative lens and a positive lens cemented together) and an aspherical plastic lens. The cemented lens functions to correct chromatic aberration.

As described above, a plastic lens used in the third lens group desirably satisfies the following conditional expression (1):

$$5.0<f3/fw<7.0 \qquad (1)$$

where f3 is a focal length of a plastic lens in the third lens group and fw is a focal length of the zoom lens at wide-angle end. In detail, this conditional expression (1) specifies the power arrangement of the plastic lens in the third lens group, and if the plastic lens satisfies this conditional expression, aberration is corrected sufficiently and a compact and high performance zoom lens system is actualized. If the plastic lens is lower than the lower limit and power is strengthened, influence of temperature change becomes too big to adjust by expansion or contraction of the lens barrels, and it is not suitable in view of aberration correction, though the zoom system will be compact. If the power becomes weak by exceeding the upper limit, back focus extends and the entire lens system tends to become large. Therefore, it is not suitable.

If a plastic lens used in the third lens group satisfies the conditional expression (1), it is possible to keep linearity of temperature characteristics within a good range. That is, it is possible to keep variation of image location in accordance with temperature characteristics within focal depth.

Plastic lens used for the fourth lens group is desirable to satisfy the following conditional expression (2):

$$fw/|f4p|<0.03 \qquad (2)$$

where fw is a focal length of the zoom lens at the wide-angle end, and f4p is a focal length of the plastic lens used in the fourth lens group.

This conditional expression (2) specifies the power arrangement of the plastic lens. If the plastic lens is constructed within the above range with a weak power arrangement, it is possible to reduce the influence of temperature change. If the plastic lens is beyond the above range, influence of temperature change becomes big. In addition, this plastic lens may have an aspherical surface. If so, it becomes possible to correct coma aberration and image surface characteristics satisfactorily.

The plastic lens used in the third lens group may have its meniscus shape with its convex surface turning toward the object side. If so, this enables the front principal point of the third lens group to be in object side space. This can reduce the interval between the principal point of the second lens group and that of the third lens group at the telephoto side. As a result, it becomes possible to make zoom lens system compact while preserving the area in which the second lens group can move in zooming. That is, length of lens barrel can be shortened. In addition, it is possible to strengthen the power of the fourth lens group 44 because it is possible to position the lens of the third lens group 33 in lower ray height position in paraxial region. As a result, it can contribute to improve Petzval sum when size is reduced. As described above, by locating powerful plastic lens in the third lens group and weak power plastic lens in the fourth lens group and by setting the lens barrel construction and lens barrel materials to be optimum, it can be possible to provide a compact, inexpensive and high performance zoom lens system.

Numerical values in the first embodiment are shown in TABLE 1.

TABLE 1

| | f = 3.76~74.1 | | F/1.70~F/3.26 | | | |
|---|---|---|---|---|---|---|
| r1 | 47.047 | d1 | 1.000 | n1 | 1.84666 | v1 | 23.8 |
| r2 | 24.124 | d2 | 5.450 | n2 | 1.60311 | v2 | 60.6 |
| r3 | −115.160 | d3 | 0.15 | | | | |
| r4 | 20.415 | d4 | 3.000 | n3 | 1.62041 | v3 | 60.4 |
| r5 | 51.876 | d5 | variable | | | | |
| r6 | 45.627 | d6 | 0.700 | n4 | 1.80610 | v4 | 40.8 |
| r7 | 6.608 | d7 | 2.529 | | | | |
| r8 | −8.646 | d8 | 0.700 | n5 | 1.72000 | v5 | 50.5 |
| r9 | 6.283 | d9 | 2.400 | n6 | 1.80518 | v6 | 25.4 |
| r10 | 92.981 | d10 | variable | | | | |
| r11 | diaphragm | d11 | 0.85 | | | | |
| r12* | 9.332 | d12 | 2.900 | n7 | 1.49176 | v7 | 57.6 |
| r13 | 89.083 | d13 | variable | | | | |
| r14* | 30.888 | d14 | 1.500 | n8 | 1.49176 | v8 | 57.6 |
| r15* | 26.841 | d15 | 0.500 | | | | |
| r16 | 11.000 | d16 | 0.700 | n9 | 1.84666 | v9 | 23.8 |
| r17 | 5.585 | d17 | 3.100 | n10 | 1.69680 | v10 | 55.6 |
| r18 | −37.410 | d18 | variable | | | | |
| r19 | ∞ | d19 | 2.160 | n11 | 1.51633 | v11 | 64.3 |
| r20 | ∞ | | | | | | |

TABLE 1-continued variable interval:

| f | d5 | d10 | d13 | d18 |
|---|---|---|---|---|
| 3.76 | 0.698 | 20.883 | 10.803 | 4.000 |
| 27.3 | 16.462 | 5.118 | 5.497 | 9.306 |
| 74.1 | 20.567 | 1.014 | 12.043 | 2.760 |

| The 12th aspherical surface coefficient | |
|---|---|
| K | −0.41242 |
| A | −1.16009 × 10$^{-4}$ |
| B | −3.17744 × 10$^{-9}$ |
| C | −4.61887 × 10$^{-9}$ |
| D | 7.78337 × 10$^{-11}$ |

| The 14th aspherical surface coefficient | | The 15th aspherical surface coefficient | |
|---|---|---|---|
| K | −16.270 | K | 1.3788 |
| A | 0.0 | A | 8.96200 × 10$^{-5}$ |
| B | 0.0 | B | −1.93390 × 10$^{-8}$ |
| C | 0.0 | C | 2.16390 × 10$^{-8}$ |
| D | 0.0 | D | 1.35340 × 10$^{-10}$ |
| f3/fw = 5.57 | | fw/|f4p| = 0.008 | |

In TABLE 1, the reference symbols r1, r2 and the like represent radius of curvature (mm) of each surface of the lenses in order from an object side. The reference symbols d1, d2 and the like represent thickness (mm) of each lens and airspaces (mm) respectively. The reference symbols n1, n2 and so on represent refractive index at the d-line of each lens. The reference symbols v1, v2 and the like represent Abbe numbers using the d-line as a reference. The reference symbols f, F/ and 2ω represent focal length of the entire lens system, F-number and incident angle, respectively. Surfaces with the asterisk mark (*) are aspherical surfaces. The shape of the aspherical surfaces is shown by the following expression (3):

$$X=(h^2/r)/(1+(1-(K+1)h^2/r^2)^{1/2})+Ah^4+Bh^6+Ch^8+Dh^{10} \quad (3)$$

where symbol h represents height from the optical axis, and symbol X represents distance from the tangent plane of the aspherical surface crest of the aspherical surface shape of height h, and curvature radius of reference spherical surface is represented by r. Aspherical surface coefficients K, A, B, C and D are as shown in TABLE 1.

Figure 2:
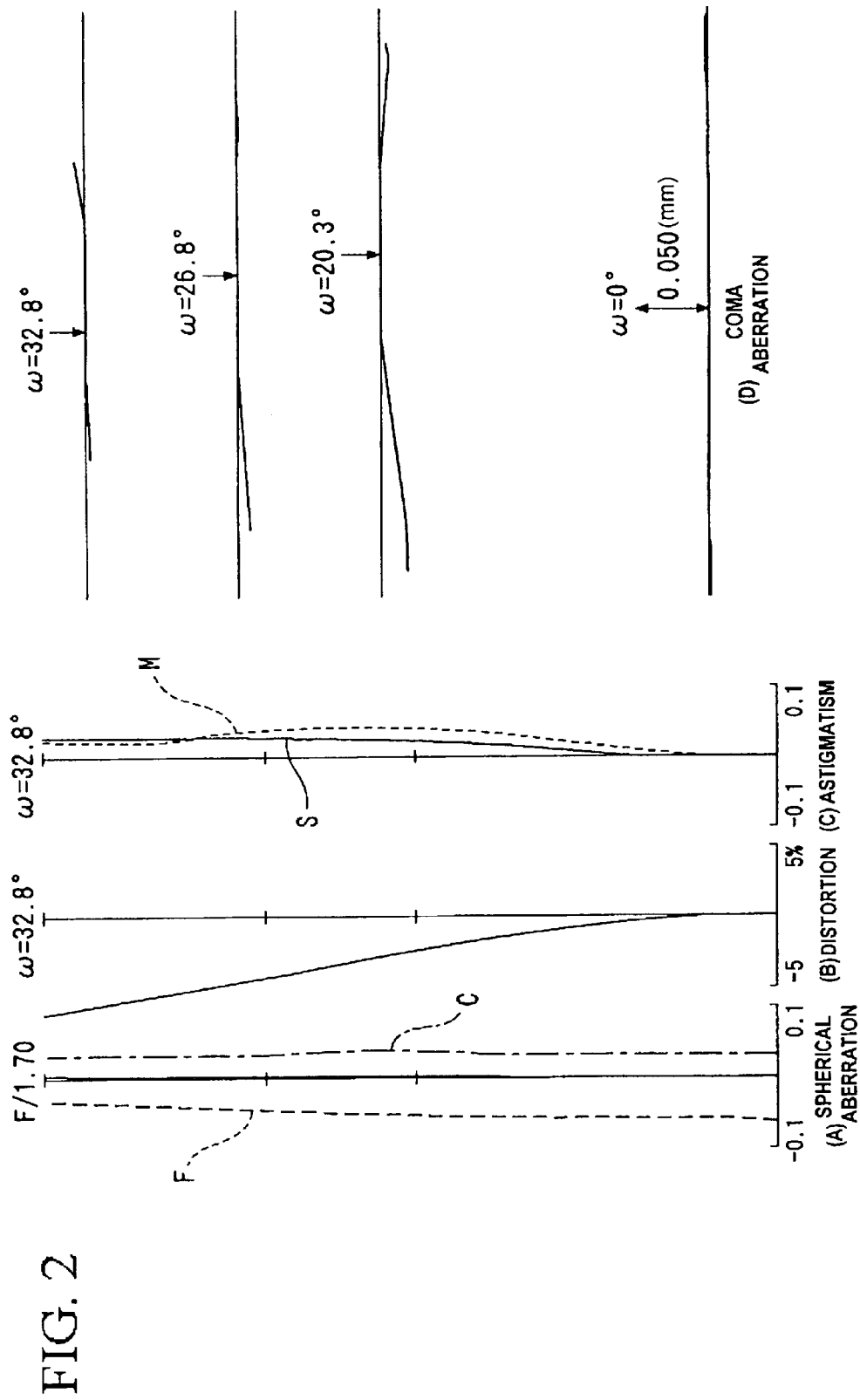
FIG. 2 shows graphs of aberration curves at wide-angle end (f: 3.76) of the lens system of the first exemplary embodiment.
Figure 3:
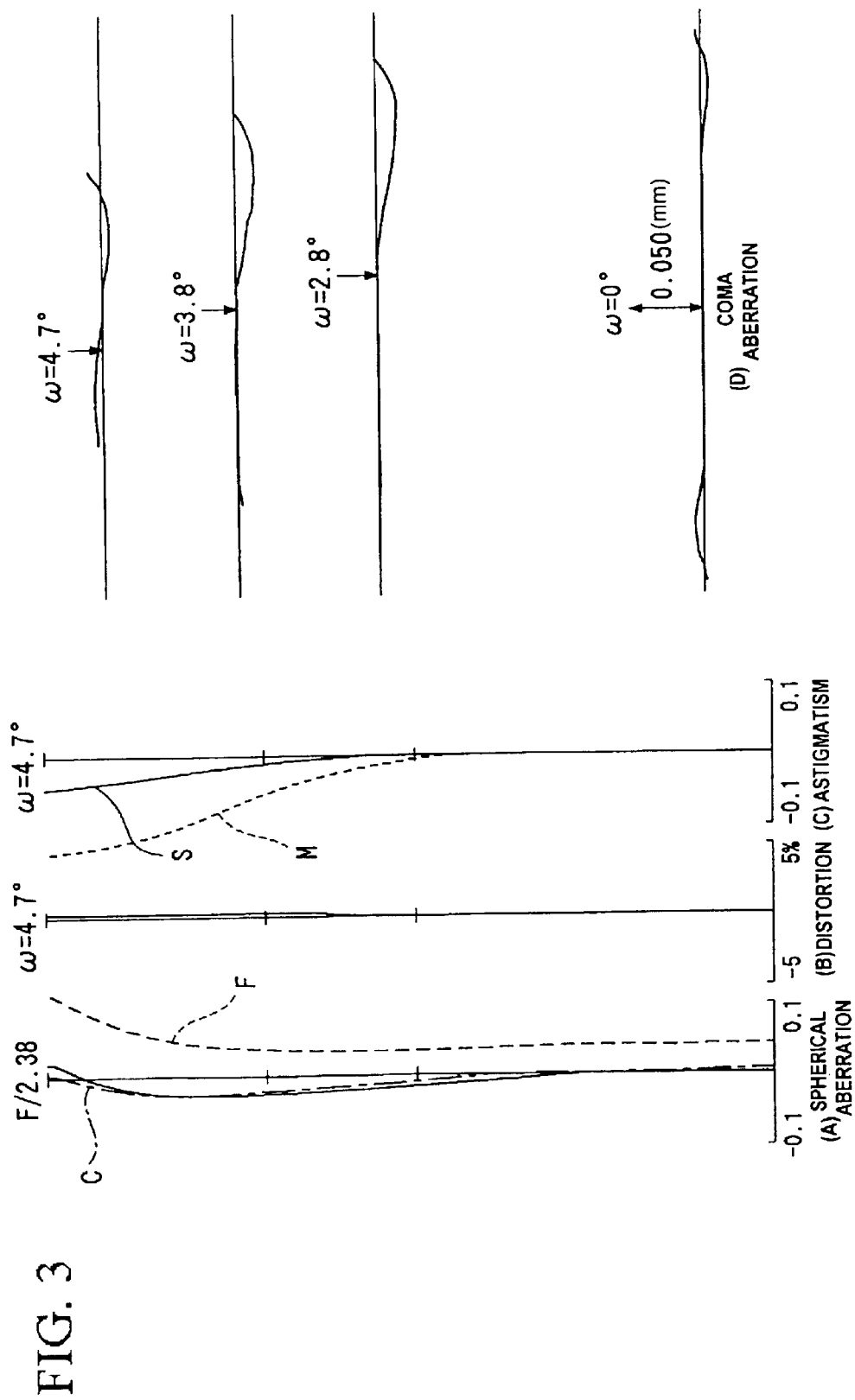
FIG. 3 shows graphs of aberration curves at a middle position (f: 27.3) of zooming of the lens system of the first exemplary embodiment.
Figure 4:
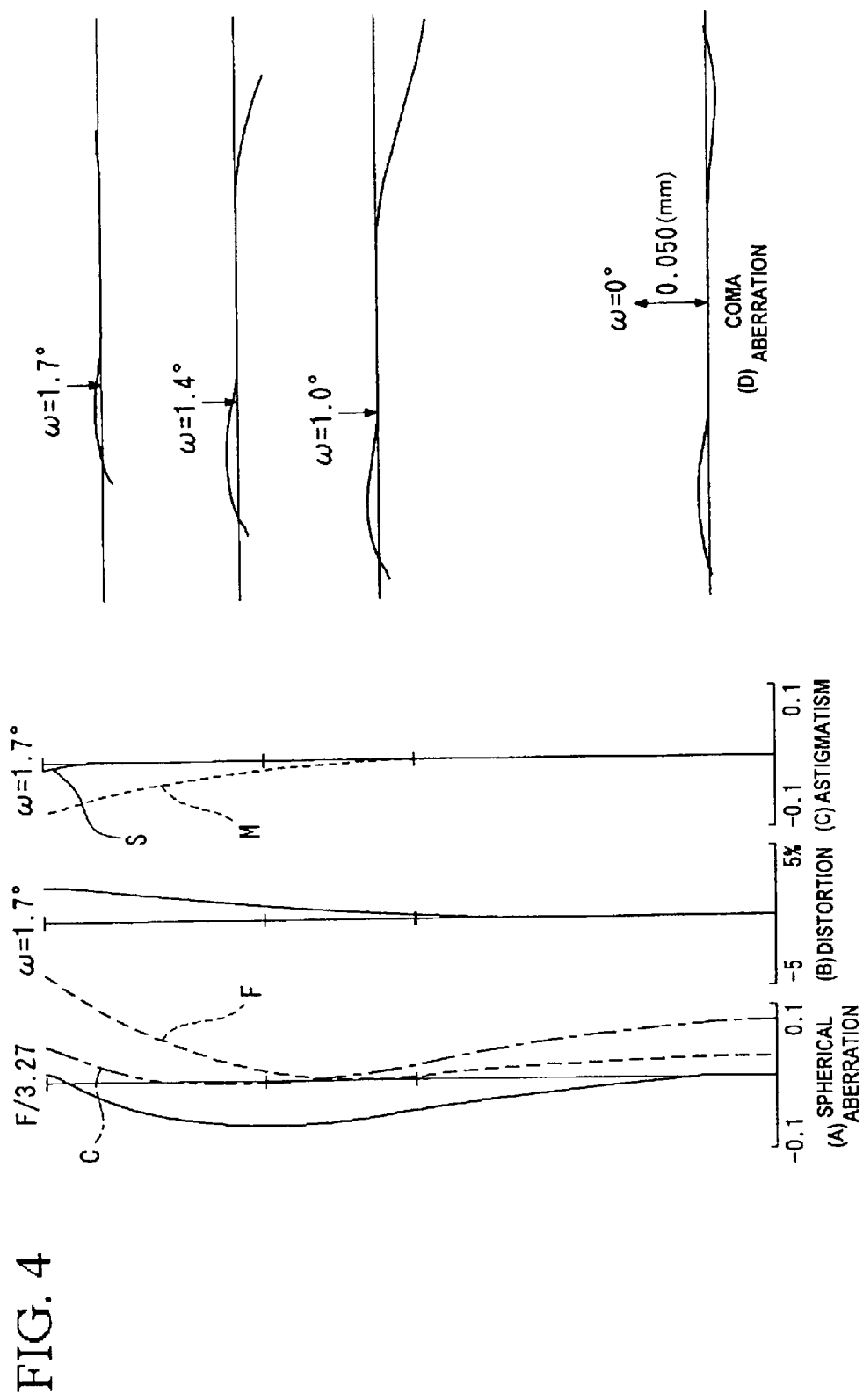
FIG. 4 shows graphs of aberration curves at telephoto end (f: 74.1) of the lens system of the first exemplary embodiment.

FIGS. 2 through 4 are graphs showing aberration curves in wide-angle end, intermediate focal length, and telephoto end respectively. In FIGS. 2 through 4, spherical aberration (mm) is shown in (A), distortion (%) is shown in (B), astigmatism (mm) is shown in (C) and coma aberration (mm) is shown in (D) respectively. In the graphs of spherical aberration in FIGS. 2 though 4, the reference symbol F represents F-line, and the reference symbol C represents C-line. In the astigmatism graphs, the reference symbols S and M represent sagittal image surface and meridional image surface respectively. As the graphs show, favorable optical performance with small aberration is achieved.

(The Second Embodiment)

Figure 5:
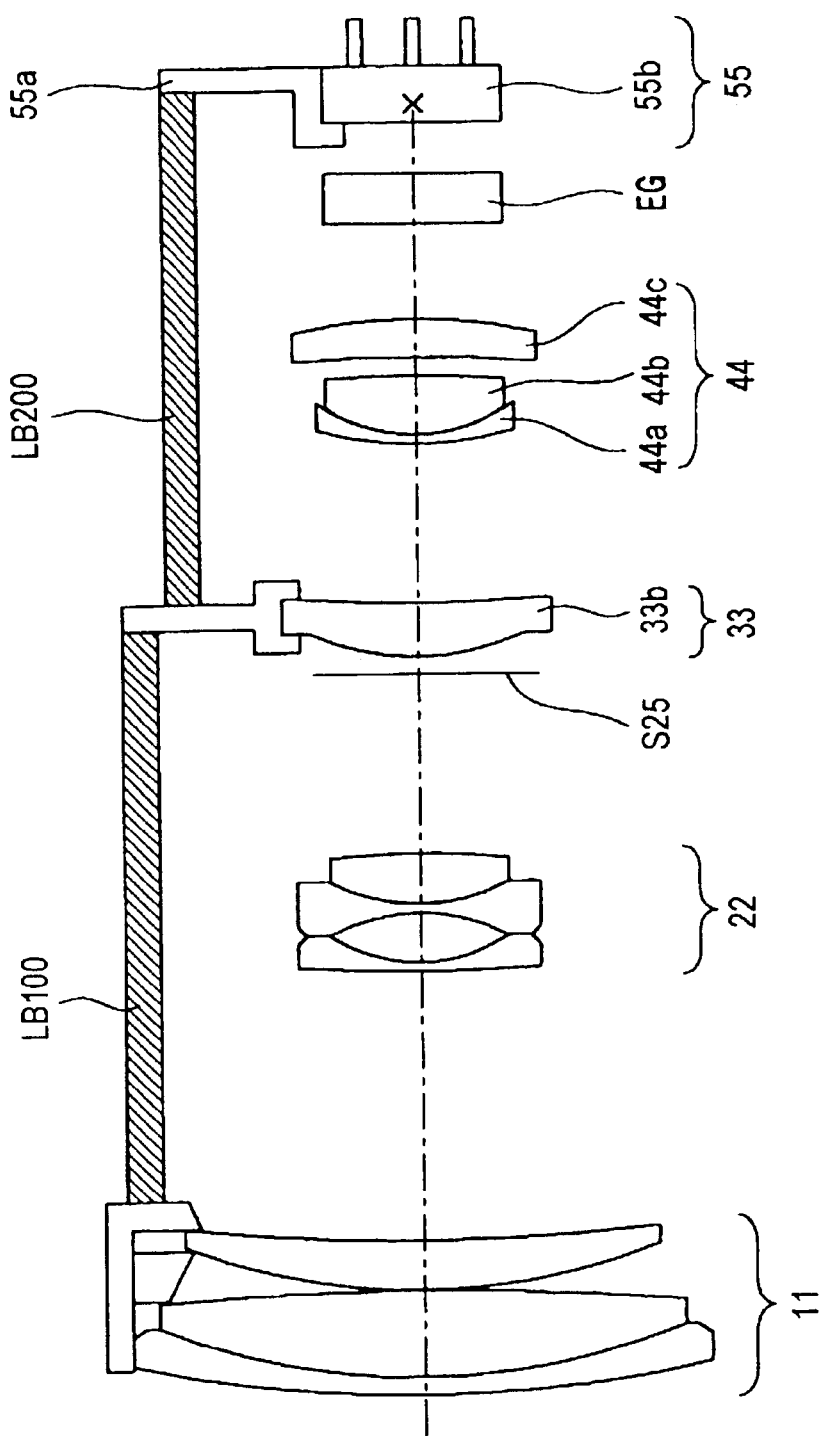
FIG. 5 is a sectional view showing construction of a zoom lens system according to a second exemplary embodiment of the present invention.

FIG. 5 shows a zoom lens system having temperature compensation function of the second embodiment of the present invention. In FIG. 5, construction of the first lens group 11, the second lens group 22, the third lens group 33, the fourth lens group 44 and the image pickup element 55 is similar to that of shown in FIG. 1. The second embodiment is different from the first embodiment in arrangement of the fourth lens group. In the second embodiment, the fourth lens group is so arranged that a cemented positive lens into which a negative lens 44a and a positive lens 44b are cemented together and an aspherical plastic lens 44c are placed in order from the object side.

TABLE 2 shows numerical embodiment of this lens. In TABLE 2, each reference symbol shows the same meaning as that of TABLE 1.

TABLE 2

| f = 3.99~77.7 | | | | F/1.74~F/3.35 | | | |
|---|---|---|---|---|---|---|---|
| r1 | 54.923 | d1 | 1.000 | n1 | 1.84666 | v1 | 23.8 |
| r2 | 28.108 | d2 | 4.750 | n2 | 1.60311 | v2 | 60.6 |
| r3 | −149.873 | d3 | 0.120 | | | | |
| r4 | 24.418 | d4 | 2.850 | n3 | 1.62041 | v3 | 60.4 |
| r5 | 64.511 | d5 | variable | | | | |
| r6 | 37.660 | d6 | 0.550 | n4 | 1.83400 | v4 | 37.3 |
| r7 | 7.181 | d7 | 2.925 | | | | |
| r8 | −9.001 | d8 | 0.550 | n5 | 1.72000 | v5 | 50.5 |
| r9 | 8.908 | d9 | 2.550 | n6 | 1.84666 | v6 | 23.8 |
| r10 | −102.083 | d10 | variable | | | | |
| r11 | diaphragm | d11 | 0.75 | | | | |
| r12* | 10.681 | d12 | 3.200 | n7 | 1.49176 | v7 | 57.6 |
| r13 | 52.009 | d13 | variable | | | | |
| r14 | 12.332 | d14 | 0.550 | n8 | 1.84666 | v8 | 23.8 |
| r15 | 6.405 | d15 | 3.250 | n9 | 1.71300 | v9 | 54.1 |
| r16 | −47.893 | d16 | 1.100 | | | | |
| r17* | −32.965 | d17 | 1.650 | n10 | 1.49176 | v10 | 57.6 |
| r18* | −43.560 | d18 | variable | | | | |
| r19 | ∞ | d19 | 2.900 | n11 | 1.51633 | v11 | 64.1 |
| r20 | ∞ | | | | | | | variable interval:

| f | d5 | d10 | d13 | d18 |
|---|---|---|---|---|
| 3.99 | 0.641 | 25.891 | 11.335 | 4.000 |
| 31.3 | 20.516 | 6.015 | 5.758 | 9.577 |
| 77.7 | 25.543 | 0.988 | 12.623 | 2.712 |

| The 12th aspherical surface coefficient | |
|---|---|
| K | −0.2786 |
| A | −9.47288 × 10$^{-5}$ |
| B | 7.40295 × 10$^{-8}$ |
| C | −7.29400 × 10$^{-10}$ |
| D | −2.93142 × 10$^{-11}$ |

| The 17th aspherical surface coefficient | | The 18th aspherical surface coefficient | |
|---|---|---|---|
| K | 4.6937 | K | −58.698 |
| A | −3.89223 × 10$^{-5}$ | A | 5.28317 × 10$^{-5}$ |
| B | 1.19931 × 10$^{-6}$ | B | 4.31024 × 10$^{-6}$ |
| C | −2.16481 × 10$^{-8}$ | C | −2.16390 × 10$^{-7}$ |
| D | −2.34775 × 10$^{-10}$ | D | 2.84242 × 10$^{-9}$ |
| f3/fw = 6.68 | | fw/|f4p| = 0.014 | |

Figure 6:
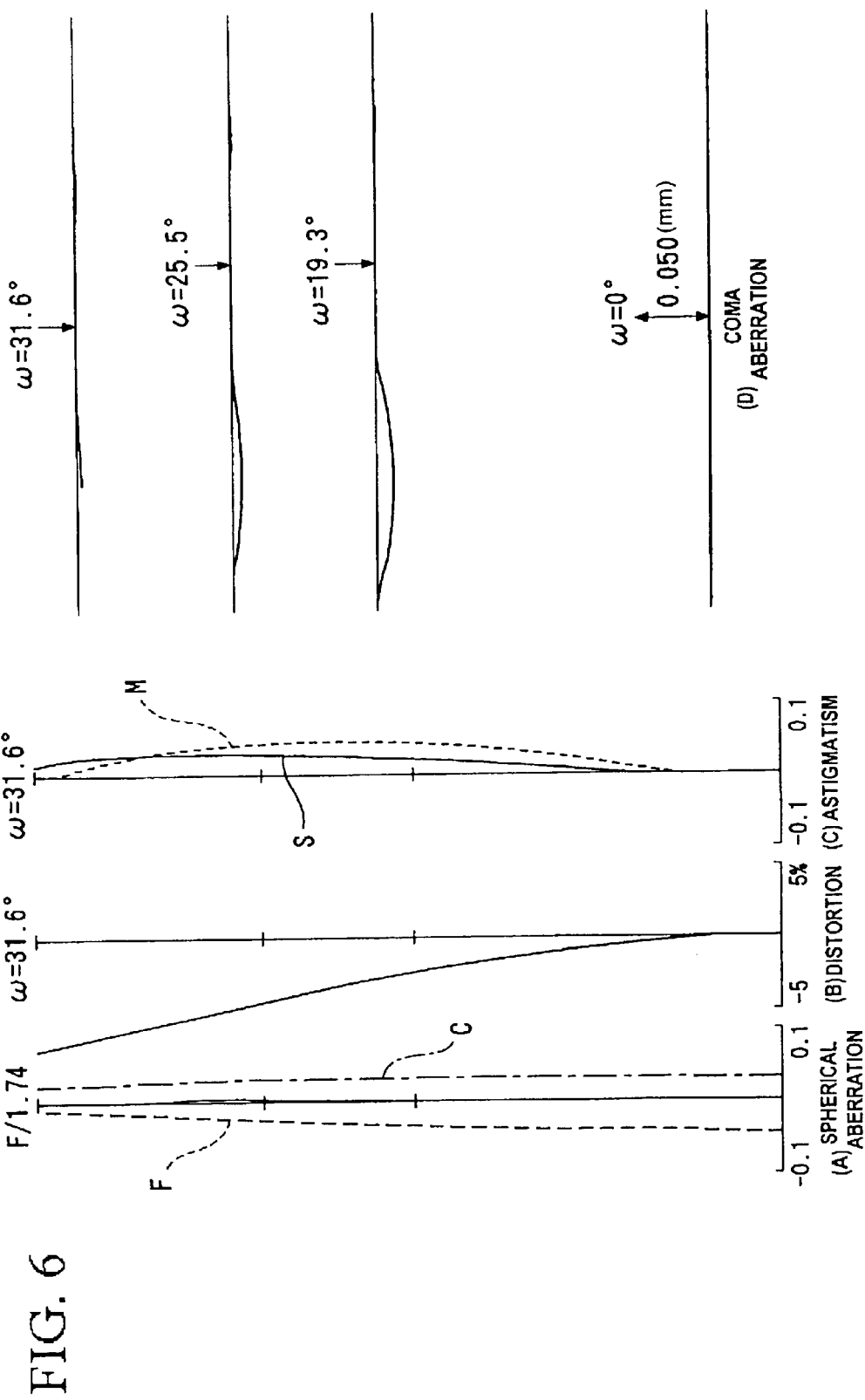
FIG. 6 shows graphs of aberration curves at wide-angle end (f: 3.99) of the lens system of the second exemplary embodiment.
Figure 7:
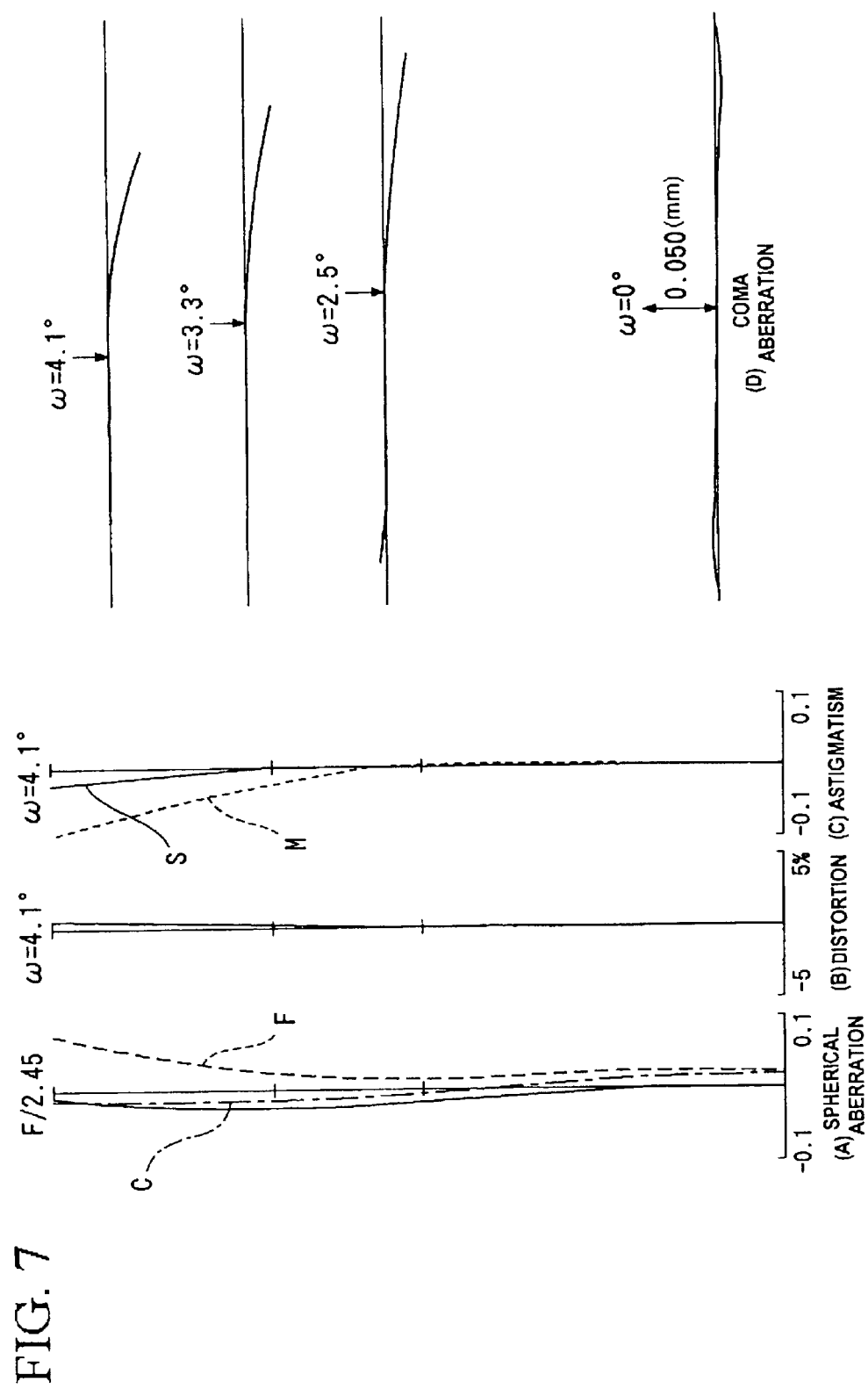
FIG. 7 shows graphs aberration curves at a middle position (f: 31.3) of zooming of the lens system of the second exemplary embodiment.
Figure 8:
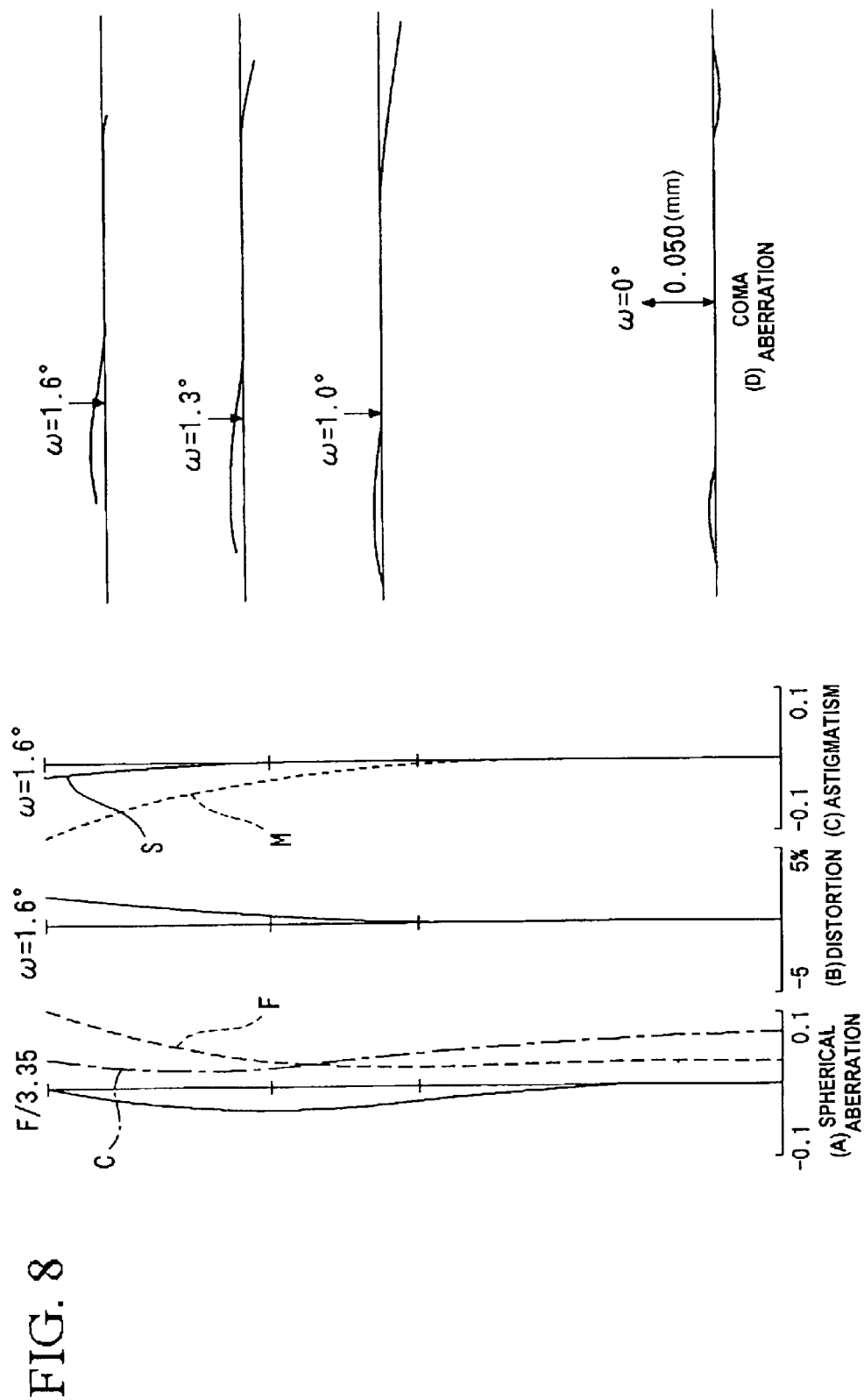
FIG. 8 shows graphs of aberration curves at telephoto end (f: 77.7) of the lens system of the second exemplary embodiment.

FIGS. 6 through 8 are graphs showing aberration curves in wide-angle end, intermediate focal length, and telephoto end respectively as in the first embodiment. Similar to the first embodiment, appropriate good optical performance with small aberration is achieved.

(The Third Embodiment)

Figure 9:
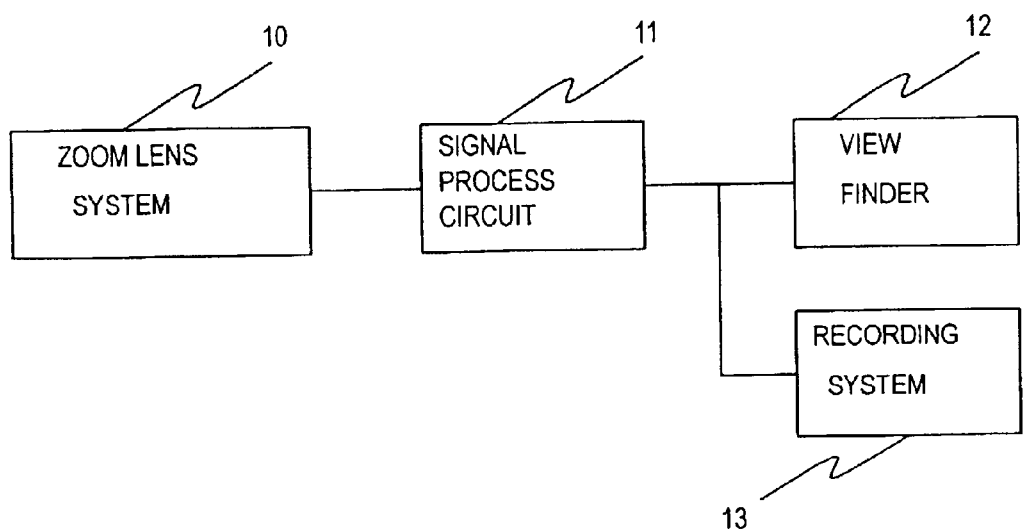
FIG. 9 shows block diagram of the third exemplary embodiment of the present invention.

FIG. 9 shows construction of a video camera in the third embodiment of the present invention. This construction of the video camera can be used for digital still camera and so on. In FIG. 9, the output signal from the zoom lens system 10 is reproduced to a video signal at signal process circuit 11 and reproduced video can be seen through view finder 12. In addition, the reproduced video signal can be recorded on a predetermined recording media (not shown) by recording system 13.

If a camera unit is constructed using a zoom lens system of the present embodiment, a compact, high-performance and inexpensive video camera with high optical zoom ratio of approximately 20 times can be achieved.

As explained above, the present invention attempts to solve problems associated with plastic, and achieves a high zoom ratio (e.g. 20 times) with a lens constructed of at least 9 pieces. As a result, it becomes possible to provide a compact and inexpensive zoom lens with aberration appropriately compensated.

Thus, a low-cost, compact video camera with a high zoom ratio (e.g. 20 times) can be achieved by using a zoom lens system in accordance with the present invention.

The present invention has been described with reference to specific embodiments. However, such embodiments are not intended to limit the scope of the claims appended hereto. It will be apparent to those skilled in the art that modifications may be made in the embodiment chosen for illustration without departing from the spirit and scope of the invention.

What is claimed is:

1. A zoom lens system comprising:
   a first lens group;
   a second lens group that moves along an optical axis;
   a third lens group that has a positive refractive power, a negative temperature coefficient of refractive index and a predetermined focal length;
   a fourth lens group that moves along said optical axis;
   a first lens barrel which extends from said first lens group to said third lens group; and
   a second lens barrel which extends from said third lens group to an image pickup element;
   wherein said first and second lens barrels each has a respective predetermined linear expansion coefficient, and variation of image location caused by temperature change in said first, second, third and fourth lens groups is cancelled by image location variation caused by expansion or contraction of at least one of said first lens barrel and said second lens barrel.

2. The zoom lens system according to claim 1, wherein said third lens group includes a plastic lens and wherein said plastic lens satisfies the following conditional expression:

$$5.0 < f3/fw < 7.0$$

where f3 is a focal length of said plastic lens in said third lens group, and fw is a focal length of said zoom lens system at wide-angle end.

3. The zoom lens system according to claim 1, wherein linear expansion coefficient L of lens barrel satisfies the following conditional expression:

$$2 \times 10^{-5} < L < 7 \times 10^{-5}.$$

4. A zoom lens system comprising:
   a first lens group having a positive refractive power;
   a second lens group that has negative refractive power and moves along an optical axis;
   a third lens group having a further positive refractive power and fixed relative to a first lens barrel;
   a fourth lens group that has positive refractive power and moves along said optical axis;
   said first lens barrel which extends from said first lens group to said third lens group; and
   a second lens barrel which extends from said third lens group to an image pickup element;
   wherein variation of image location caused by temperature change in said first, second, third and fourth lens groups is cancelled by variation of image location caused by expansion or contraction of at least one of said first lens barrel and said second lens barrel.

5. The zoom lens system according to claim 4, wherein change of refractive index of said lens system caused by temperature change has negative coefficient relative to temperature rise, and said lens barrels have a positive linear expansion coefficient relative to temperature rise.

6. The zoom lens system according to claim 4, wherein a plastic lens is used in said third lens group.

7. The zoom lens system according to claim 6, wherein said plastic lens satisfies the following conditional expression:

$$5.0 < f3/fw < 7.0$$

where f3 is a focal length of said plastic lens in said third lens group, and fw is a focal length of said zoom lens system at wide-angle end.

8. The zoom lens system according to claim 7, wherein said plastic lens used in said third lens group has meniscus shape with its convex turning toward an object side.

9. The zoom lens system according to claim 7, wherein said third lens group includes a plastic lens of negative temperature coefficient of refractive index and at least one surface of the lens is an aspherical surface.

10. The zoom lens system according to claim 7, wherein said first and second lens barrels have each a predetermined linear expansion coefficient, and length of said lens barrels is set for canceling variation of image location caused by temperature change of said lens groups.

11. The zoom lens system according to claim 2, wherein total number of lenses used for the lens system is at least nine.

12. The zoom lens system according to claim 2, wherein total number of lenses used for the lens system is ten.

13. The zoom lens system according to claims 2, wherein said fourth lens group includes a positive cemented lens into which a negative lens and a positive lens are cemented together, and a plastic lens, and wherein at least one surface of said plastic lens in said fourth lens group is aspherical, and said plastic lens in said fourth lens group satisfies the following conditional expression:

$$fw/|f4p| < 0.03$$

where fw is a focal length of the zoom lens at wide-angle end and f4p is a focal length of said plastic lens in said fourth lens group.

14. The zoom lens system according to claims 7, wherein said fourth lens group includes a positive cemented lens into which a negative lens and a positive lens are cemented together, and a plastic lens, and wherein at least one surface of said plastic lens in said fourth lens group is aspherical, and said plastic lens in said fourth lens group satisfies the following conditional expression:

$$fw/|f4p| < 0.03$$

where fw is a focal length of the zoom lens at wide-angle end and f4p is a focal length of said plastic lens in said fourth lens group.

15. The zoom lens system according to claim 10, wherein linear expansion coefficient L of said first or second lens barrel satisfies the following conditional expression:

$$2 \times 10^{-5} < L < 7 \times 10^{-5.}$$

16. The zoom lens system according to claim 15, wherein linear expansion coefficient of said second lens barrel is larger than that of said first lens barrel.

17. A video camera including a zoom lens system, said zoom lens system comprising:
   a first lens group having a positive refractive power;
   a second lens group that has negative refractive power and moves along an optical axis;
   a third lens group having a further positive refractive power and fixed relative to a first lens barrel;
   a fourth lens group that has positive refractive power and moves along said optical axis;
   said first lens barrel which extends from said first lens group to said third lens group; and
   a second lens barrel which extends from said third lens group to an image pickup element;
   wherein variation of image location caused by temperature change in said first, second, third and fourth lens groups is cancelled by variation of image location caused by expansion or contraction of at least one of said first lens barrel and second lens barrel.

18. The video camera according to claim 17, wherein said third lens group includes a plastic lens and wherein said plastic lens satisfies the following conditional expression:

$$5.0 < f3/fw < 7.0$$

where f3 is a focal length of said plastic lens in said third lens group, and fw is a focal length of said zoom lens system at wide-angle end.

* * * * *